United States Patent
Snider et al.

(10) Patent No.: US 11,697,774 B2
(45) Date of Patent: Jul. 11, 2023

(54) SYSTEMS AND METHODS FOR SEPARATING HYDROCARBONS WITH SUBSTANTIALLY REDUCED EMISSIONS

(71) Applicant: Designer Fuels LLC, Bakersfield, CA (US)

(72) Inventors: George E. Snider, Hardeeville, SC (US); Darin Diorio, Wytheville, VA (US)

(73) Assignee: DESIGNER FUELS LLC, Bakersfield, CA (US)

( * ) Notice: Subject to any disclaimer, the term of this patent is extended or adjusted under 35 U.S.C. 154(b) by 0 days.

(21) Appl. No.: 17/157,521

(22) Filed: Jan. 25, 2021

(65) Prior Publication Data

US 2022/0235277 A1 Jul. 28, 2022

(51) Int. Cl.
*C10G 7/00* (2006.01)
*C10G 7/12* (2006.01)
(Continued)

(52) U.S. Cl.
CPC ............ *C10G 7/12* (2013.01); *B01D 3/143* (2013.01); *B01D 5/006* (2013.01); *B01D 5/0036* (2013.01);
(Continued)

(58) Field of Classification Search
CPC . C10G 5/06; C10G 7/00; C10G 31/06; C10G 53/02; C10G 2300/202;
(Continued)

(56) References Cited

U.S. PATENT DOCUMENTS 1,394,488 A * 10/1921 French ................ C10G 7/00
208/359
2,805,981 A 9/1957 Cavin et al.
(Continued)

FOREIGN PATENT DOCUMENTS

CN 203333598 U 12/2013
GB 760192 A 10/1956

OTHER PUBLICATIONS

International Search Report and Written Opinion of the International Searching Authority; Application No. PCT/IB2022/050364; Completed: Mar. 14, 2022; dated Mar. 29, 2022; 15 Pages.

*Primary Examiner* — Prem C Singh
*Assistant Examiner* — Brandi M Doyle
(74) *Attorney, Agent, or Firm* — Mark M. Friedman (57) ABSTRACT

A modular crude oil refinery (MCOR) is designed for smaller scale deployment with a capacity to process in the range of 3,000-4,000 barrels of crude oil per day in a single production unit and with the potential to scale to over 100,000 barrels per day with linked production units. More specifically, a MCOR includes a low temperature, low pressure primary separation reactor, condensing system and recirculation systems operating in a closed loop configuration that enable the production of both heavy and light hydrocarbon products with substantially no emissions. The MCOR has the capability to receive and process crude-oil feedstocks of varying API gravity and be controlled to produce a variety of both heavy and light products including cleaner-burning bunker fuels, jet fuels, diesel fuels, gasoline fuels and asphalt binders.

38 Claims, 8 Drawing Sheets

(51) Int. Cl.
*B01D 5/00* (2006.01)
*B01D 3/14* (2006.01)
*B05B 1/30* (2006.01)

(52) U.S. Cl.
CPC .............. *B01D 5/0093* (2013.01); *B05B 1/30* (2013.01); *C10G 2300/202* (2013.01); *C10G 2300/308* (2013.01); *C10G 2300/405* (2013.01); *C10G 2300/4006* (2013.01); *C10G 2300/4012* (2013.01); *C10G 2300/4018* (2013.01); *C10G 2300/4062* (2013.01); *C10G 2300/4068* (2013.01); *C10G 2300/4081* (2013.01); *C10G 2400/04* (2013.01); *C10G 2400/06* (2013.01); *C10G 2400/16* (2013.01)

(58) Field of Classification Search
CPC ...... C10G 2300/308; C10G 2300/4012; C10G 2300/4006; C10G 2300/4018; C10G 2300/405; C10G 2300/4062; C10G 2300/4068; C10G 2300/4081; C10G 2400/04; C10G 2400/06; C10G 2400/16; B01D 5/0093; B01D 3/143; B05B 1/30; B05B 1/006; B05B 1/0036
See application file for complete search history.

(56) References Cited

U.S. PATENT DOCUMENTS

| | | |
|---|---|---|
| 2,897,146 A | 7/1959 | Waddill |
| 3,160,578 A | 12/1964 | Saxton et al. |
| 4,239,618 A | 12/1980 | Graham et al. |
| 2011/0084000 A1 | 4/2011 | Duyvesteyn et al. |
| 2013/0220889 A1 | 8/2013 | Zhu et al. |
| 2014/0224637 A1 | 8/2014 | Bhargava et al. |
| 2016/0184738 A1 | 6/2016 | Matsuura |
| 2016/0296853 A1 | 10/2016 | Boylan |
| 2017/0260461 A1* | 9/2017 | Seccombe ............ C10G 55/04 |
| 2021/0102126 A1* | 4/2021 | Dyer .................... C10G 55/04 |

* cited by examiner

SYSTEMS AND METHODS FOR SEPARATING HYDROCARBONS WITH SUBSTANTIALLY REDUCED EMISSIONS

FIELD OF THE INVENTION

The invention generally relates to a modular crude oil refinery (MOOR). The MOOR is designed for smaller scale deployment with a capacity to process in the range of 3,000-4,000 barrels of crude oil per day in a single production unit and up to or greater than 100,000 barrels per day with linked production units. More specifically, a MOOR includes a low temperature, low pressure primary separation reactor, condensing system and recirculation systems operating in a closed loop configuration that enable the production of both heavy and light hydrocarbon products with substantially no greenhouse gas (GHG) emissions. The MOOR has the capability to receive and process crude-oil feedstocks of varying API gravity and be controlled to produce a variety of both heavy and light products including cleaner-burning bunker fuels, jet fuels, diesel fuels, gasoline fuels and asphalt binders.

BACKGROUND OF THE INVENTION

The properties of hydrocarbons depend on the number and arrangement of the carbon and hydrogen atoms in the molecules. Hydrocarbons containing up to four carbon atoms are usually gases, those with 5 to 19 carbon atoms are usually liquids, and those with 20 or more carbon atoms are solids at ambient temperatures. Crude oils range in consistency from water to tar-like solids, and in color from clear to black. An "average" crude oil contains about 84% carbon, 14% hydrogen, 1%-3% sulfur, and less than 1% each of nitrogen, oxygen, metals, and salts. Crude oils are generally classified as paraffinic, naphthenic, or aromatic, based on the predominant proportion of similar hydrocarbon molecules. Mixed-base crudes have varying amounts of each type of hydrocarbon. Refinery crude base stocks usually consist of mixtures of two or more different crude oils. The conventional energy-intensive oil refining process uses chemicals, catalysts, heat and pressure to separate and combine the basic types of hydrocarbon molecules naturally found in crude oil into groups of similar molecules. In addition, refining processes can be used to rearrange structures and bonding patterns into different hydrocarbon molecules and compounds.

Throughout the history of refining, various treatment methods have been used to remove non-hydrocarbons, impurities and other constituents that adversely affect the properties of finished products or reduce the efficiency of the conversion processes. It is generally accepted fact that $SO_x$ and $NO_x$ emissions from fossil fuel combustion affects human health, especially when combined with atmospheric aerosols that form "acid rain" and more harmful secondary pollutants (including toxic mercury, sulfur oxides, sulfuric acids, nitric acids, hydrogen peroxides) that are absorbed by floating particulate matter and dissolved in rain droplets to exacerbate local air pollution and change the chemistry of local water supplies. Countries today have decades of experience and scientific proof about the effects on agriculture, livestock and humans from burning fossil fuels. No longer are governments tolerating the sun-blocking smog and respiratory harm to their populations caused by unregulated fossil fuel combustion emissions. Scientific studies worldwide estimate that $SO_x$ and $NO_x$ emissions from fossil fuels are responsible for the deaths of millions of children and the elderly, due to respiratory harm from fossil fuel combustion pollutants. Concern for the environmental effects of burning fossil fuels has recently turned to the global maritime shipping industry, where shipping pollution emissions of particulate matter (PM) smaller than 2.5 microns is estimated in recent studies to be responsible for 60,000 premature cardiopulmonary deaths every year as a consequence of ships burning high-sulfur low-purity bunker fuels. Low-grade ship bunker fuel (or fuel oil) can have more than 2,000-3,000 times the sulfur content of low-sulfur diesel fuels used in US and European automobiles. The International Maritime Organization (IMO) used such data to justify enactment of its IMO 2020 regulations for the shipping industry to burn only low-sulfur bunker fuels in order to reduce harmful SOx and particulate matter (PM) emissions from maritime sources. As the fuel market moves to a low-sulfur world, low-SOx bunker fuels, jet fuels, kerosene, diesel fuels and gasoline fuels will become the most in-demand fuels in the market. The global move to low-sulfur fuels is expected to reduce markets and demand for high-sulfur crude oil produced from Middle East based Organization of the Petroleum Exporting Countries (OPEC) countries. "Sour oil"-producing countries, like Saudi Arabia, Iraq, UAE, Kuwait and Mexico face a changing market place for oil, where their "sour" crude oil supplies may have a lower value because it costs refineries much more money to remove the sulfur, than to buy other countries' low-sulfur crude oil at a higher price in the first place.

Based on rising demand for sweet low-sulfur crude oil feedstocks to meet the low-cost needs of global low-sulfur fuel refineries, oil producers must deliver environmentally friendlier ways to refine raw crude oil, if they want to increase the number of oil refineries worldwide that would want to buy their crude.

Conventional petroleum refining methods typically focus on methods to separate crude oil into various petroleum products for different applications and to increase the value of the products relative to the crude oil feedstock. The "lighter" short hydrocarbon chain products, such as kerosene, gasoline and naphtha, are more valuable and separating these lighter chain products from the other heavier chain components has been the primary focus of most refining operations. Conventional refineries commonly use crude distillation towers to separate crude feedstock into its components, or fractions, which are often further processed by other processing units. Distillation towers typically operate by first heating crude oil to a temperature of 370-400° C. (700-750° F.) to vaporize the crude oil at or slightly above atmospheric pressure. These vapors rise through the tower and pass through a series of perforated trays or structured packing in the tower. The vapors cool as they rise and different components condense into liquid at different levels based on their respective boiling points. Different distillation fractions are drawn from the tower at different levels to yield product streams or for further processing.

Heavier fractions that do not boil off in the atmospheric distillation tower accumulate at the bottom of the tower (atmospheric residuum) and are sometimes sent to a separate distillation tower called a vacuum distillation unit (VDU) for further fractionation under a vacuum of approximately 1/20th of atmospheric pressure (often 25 to 40 mmHg or lower). At these low pressures, the lighter components of the atmospheric residuum will vaporize at temperatures of 425° C. (800° F.) that are below those where the hydrocarbon chains start to crack. This allows separation of the heavier atmospheric residuum without cracking.

The VDU typically produces a vacuum gas oil (VGO) and a vacuum residuum which are in turn sent to additional processing units for further refining. These additional processing units often use cracking processes to break down larger hydrocarbon molecules into smaller molecules to form more valuable product streams. Most major conversion units in conventional refinery operations today use some form of cracking operation. Cracking can be achieved using heat (thermal cracking) or by adding hydrogen (hydrocracking), often in the presence of a catalyst (catalytic cracking or hydrocracking).

VGO produced by the VDU is typically sent to cracking units that perform fluid catalytic cracking (FCC) or hydrocracking (HC). Vacuum residuum from the VDU is typically blended with residual fuel oil or sent to deep conversion units such as a coker or visbreaker to crack the feedstock and extract lighter components. The vacuum residuum can also be used to produce a by-product such as asphalt binder.

Refineries also commonly incorporate additional processing units that use various methods to improve yield and fuel quality and reduce contaminants, such as units for hydrotreating for desulfurization and de-nitrification, alkylation to upgrade low-value light ends (C3s and C4s) to a higher-value gasoline blend stock with relatively high-octane properties and no aromatic components, as well as reformers to upgrade heavy naphtha into a high-value gasoline blend stock by raising its octane.

The conventional refining technologies used for separation and cracking of crude oil feedstock described above have several disadvantages related to cost, safety, energy consumption and greenhouse gas and various toxic emissions. In particular, conventional refining technologies are typically complex, require expensive facilities and equipment, are expensive to operate, can require the use of expensive catalysts in the refining process, require higher operating temperatures and often higher pressures all requiring more energy to operate. Importantly, such systems typically have high emissions of greenhouse gases and other toxic emissions.

Over the years, work continues to develop systems and strategies to separate crude oil hydrocarbon fractions, produce higher quality fuels, increase refining yields of lighter products and to limit the toxic gases emitted from oil refineries.

Importantly, past systems primarily focus on upgrading various feedstocks to increase light product yield and can have limited ability to reduce carbon dioxide, sulfur and nitrogen emissions. Moreover, most crude oil refining processes utilize high pressure and elevated temperature conditions for cracking and separation of hydrocarbon molecules using costly heaters and costly fuels for high-temperature cracking and separation of asphaltenes and paraffins from the crude. Further still, such systems are inefficient as they do not completely recycle nor use the exhaust gases and deposit left-over contaminants from their processes into a residuum or asphalt by-product. As such, they have higher emissions of greenhouse gases and other toxic emissions. Moreover, conventional refining technologies are costly to build, use expensive facilities and complex equipment, are expensive to operate and use expensive catalysts in the refining process. While processes and techniques from such prior art may solve some problems, they can create other problems.

With regard to the production of high-quality asphalt binders, it is expected that the supply of this product will be affected by the ongoing closures of major refining operations throughout the world due to reduction in carbon-based fuel demand and the associated environmental concerns as well as the re-purposing of existing refineries to process biofuels as feedstock to produce biodiesel. As a result, the supply of asphalt binder is expected to decline into a continually growing road and transportation infrastructure construction market driven primarily by developing economies. Refinery closures also create particular challenges for remote and dislocated markets as these markets are being subjected to lower supply and higher costs for clean fuels and asphalt products. This problem is only expected to intensify over time as there is no substitute for asphalt in road and transportation infrastructure at this time.

As a result, there has been a need for refining systems and methods enabling the production of both heavy and light hydrocarbon products and particularly high-quality asphalt binder wherein these products are produced with:

reduced greenhouse gas and/or other emissions within closed loop refining systems;

lower temperature and pressure within a reactor during separation;

lower operating costs;

lower capex costs for separation and condensing systems and processes;

efficient recycling/use of heat throughout the systems and sub-systems;

smaller scale refineries that allow for efficient geographical distribution of these smaller refineries that can be located near or within communities; and, modular systems enabling effective scaling of production for site specific deployments to meet local market demands for a variety of hydrocarbon products.

SUMMARY OF THE INVENTION

In accordance with a first aspect of the invention, there is provided a crude oil refining system for separating hydrocarbons within a crude oil feedstock with reduced emissions comprising one or more production units, each production unit having:

a reactor for separating the feedstock into heavy and light fractions, each reactor having a reactor body including:
an atomizing system for introducing and atomizing feedstock in the reactor body under conditions to effect rapid surface-area generation of the feedstock and separation of the feedstock into heavy and light fractions;
a heavy fraction removal system adjacent a bottom of the reactor body;
a light fraction removal system adjacent a top of the reactor body;

a condenser connected to the at least one reactor to receive the light fraction, the condenser having:
a condenser body;
a sectioned cooling system configured to the condenser body to condense the light fraction into one or more light hydrocarbon products;
a light hydrocarbon collection system (LHCS) for selectively removing the one or more light hydrocarbon products;
a light fraction return system configured between the condenser and reactor to return un-condensed light fraction gases to the reactor; and, a heavy-fraction collection and recirculation system (HFCRS) connected to the heavy fraction removal system having:
a heavy fraction product system for selectively removing a heavy fraction product;

a heavy fraction recirculation system for selectively recirculating a portion of the heavy fraction to the reactor;

where each of the one or more reactors, condenser and HFCRS are connected in a loop.

In various embodiments, the system includes various combinations of the following:

- the light fraction return system includes a carrier gas system configured to selectively introduce a carrier gas into the light fraction return system.
- a vapor recovery unit is connected to the condenser and is configured to selectively bleed excess vapor from the loop.
- a burner is connected to the vapor recovery unit to burn excess vapor outside the loop and wherein combustion heat from the burner is thermally connected to the feedstock and/or the light fraction return gas as a source of heat to pre-heat the feedstock and/or the light fraction return gas.
- a blower system is configured below the atomizing system (atomizing nozzles or other similar devices) to promote vertical movement of vapor and droplets within the reactor.
- a feedstock system having a feedstock storage tank connected to the reactor, the feedstock system having at least one heater to pre-heat the feedstock prior to the reactor.
- a control system is operatively connected to the system and configured to enable selective control of temperature, pressure and flow of vapor in the reactor to set a cut-point in the reactor between the light fraction and heavy fraction.
- the control system is operatively connected to the system and configured to enable selective control of a feedstock flow rate into the reactor, a heavy fraction recirculation rate into the reactor and a heavy product removal rate from the system.
- the control system is configured to enable flash atomization of the feedstock at a reactor pressure of 0-30 in Hg.
- the atomizing system includes a plurality of atomizing nozzles and the control system and atomizing system are configured to introduce feedstock through the atomizing nozzles at 1375 to 6700 kPa (200-1,000 psi).
- the control system and atomizing nozzles are configured to introduce returned heavy fraction through the atomizing nozzles at 1375 to 6700 kPa (200-1,000 psi).
- the control system and atomizing system are configured to eject feedstock into the reactor with a droplet size diameter of 5-120 microns.
- the control system and blower system are configured to induce vapor flow within the reactor at a rate of 3-20 feet/second.
- the HFCRS includes a heater configured to add heat to the heavy fraction before the proportion of the heavy fraction is re-introduced into the reactor.
- the sectioned cooling system is a horizontal condenser configured to condense the light fraction in at least one stage, each stage producing a light hydrocarbon product including any one of or a combination of bunker fuel, diesel fuel, kerosene and naphtha.
- the sectioned cooling system is a vertical condenser configured to condense the light fraction in at least one stage, each stage producing a light hydrocarbon product including any one of or a combination of bunker fuel, diesel fuel, kerosene and naphtha.
- the uncondensed light fraction gases from the condenser have a temperature less than 10° C. (50° F.).
- the light fraction return system includes a gas trap connected to the condenser to separate uncondensed light fraction gases from the condenser as the uncondensed light fraction gases and a naphtha fraction.
- the condenser is a distillation tower configured to condense a plurality of light hydrocarbon products and a second heavy fraction configured for re-introduction into the HFCRS.
- the reactor body includes a sump for collecting the heavy fraction.
- the system includes at least two production units configured to a feedstock system in parallel, the feedstock system having a single feedstock storage tank connected to each production unit.

In another aspect, the invention provides a reactor for separating a crude oil feedstock into heavy and light fractions, the reactor having a reactor body including:

an atomizing system for introducing and atomizing the feedstock in the reactor body under conditions to effect rapid surface-area generation of the feedstock and separation of the feedstock into heavy and light fractions;

a heavy fraction removal system adjacent to the bottom of the reactor body; and, a light fraction removal system adjacent to the top of the reactor body.

In various embodiments, the reactor includes various combinations of the following:

- a feedstock system configured to the reactor for delivering feedstock to the reactor, the feedstock system having a feedstock storage tank connected to the reactor and at least one heater to pre-heat the feedstock prior to entering the reactor.
- a carrier gas system configured to the reactor for introducing a carrier gas into the reactor.
- a blower system configured below the atomizing nozzles to promote vapor circulation within the reactor.
- a vapor separator adjacent to the top of the reactor body.
- a control system operatively connected to the reactor and configured to enable selective control of temperature, pressure and flow of vapor in the reactor to set a cut-point in the reactor between the light fraction and heavy fraction.
- the control system is configured to enable selective control of a feedstock flow rate into the reactor, a heavy fraction recirculation rate into the reactor and a heavy product removal rate from the system.
- the control system is configured to enable flash atomization of the feedstock at a reactor pressure of 0-30 in Hg.
- the control system and atomizing nozzles are configured to introduce feedstock into the atomizing nozzles at 1375 to 6700 kPa (200-1,000 psi).
- the control system and atomizing nozzles are configured to eject feedstock into the reactor with a droplet size diameter of 5-120 microns.
- the control system and blower system are configured to induce vapor flow within the reactor at a rate of 3-20 feet/second.

In another aspect, the invention provides a condenser for condensing a hydrocarbon vapor, the condenser including:

a condenser body;

a sectioned cooling system configured to the condenser body to condense the hydrocarbon vapor into one or more light hydrocarbon products;

a light hydrocarbon collection system for receiving the light hydrocarbon products; and, an un-condensed vapor collection system for receiving un-condensed vapor and where the condenser is thermally connected to a separation reactor configured to supply hydrocarbon vapor to the condenser in a closed loop and return un-condensed vapor to the reactor.

In various embodiments, the condenser includes various combinations of the following:

the sectioned cooling system is a horizontal condenser configured to condense the light fraction in at least one stage, each stage having a separate compartment for containing a light hydrocarbon product, the light hydrocarbon products including any one of or a combination of bunker fuel, diesel fuel, kerosene and naphtha.

the sectioned cooling system is a vertical condenser configured to condense the light fraction in at least one stage, each stage producing a light hydrocarbon product including any one of or a combination of bunker fuel, diesel fuel, kerosene and naphtha.

the temperature of the un-condensed vapor is less than 50° F.

the condenser includes four stages configured to condense four light hydrocarbon products and includes a first section for condensing bunker fuel, a second section for condensing diesel fuel, a third section for condensing kerosene and a fourth section for condensing naphtha.

each stage of the condenser includes a heat exchanger connected to each stage configured to recover heat during condensing and where recovered heat is utilized to pre-heat a crude oil feedstock.

the condenser is a distillation tower having at least one tray, each tray configured to condense and recover the light fraction as one or more light hydrocarbon products.

the distillation tower recovers a heavy hydrocarbon product from a bottom of the distillation tower.

In another aspect, the invention provides a process for separating a crude oil feedstock into a plurality of hydrocarbon products including the steps of:

a) atomizing a crude oil feedstock in a reactor under conditions to flash vaporize the feedstock;

b) collecting a light fraction from the reactor and condensing the light fraction into one or more hydrocarbon products and an uncondensed gas fraction; and, c) collecting a heavy fraction from the reactor wherein a portion of the heavy fraction is collected as a heavy hydrocarbon product.

In various embodiments of the process, the process includes various combinations of the following:

the process includes a further step of recirculating and atomizing a portion of the heavy fraction back to the reactor.

the process includes further steps of returning uncondensed gas from step b) to the reactor.

the process includes a further step of introducing a carrier gas into the reactor and where the carrier gas is natural gas.

the process includes further steps of atomizing the crude oil feedstock and collecting the light fraction are conducted at a temperature less than 315° C.

the steps of atomizing the crude oil feedstock and collecting the light fraction are conducted at a pressure less than 0-30 in Hg.

the step of atomizing includes forming the crude oil feedstock into droplets having a droplet size diameter of 5-120 microns.

excess gas from the condenser is bled out of the closed loop and burned and used to pre-heat the crude oil feedstock.

the process includes further steps of independently controlling each of temperature, pressure and vapor velocity in the reactor to provide a cut-point between coarse light and heavy fractions.

the process includes further steps of independently controlling a feedstock flow rate into the reactor, a heavy fraction recirculation rate into the reactor and a heavy product removal rate from the reactor.

the process includes a further step of controlling reactor pressure between 0-30 in Hg during flash atomization of the feedstock.

the process includes a further step of controlling a feedstock atomizing system to introduce feedstock into the reactor through atomizing nozzles at 1375 to 6700 kPa (200-1,000 psi).

the process includes a further step of controlling the atomizing system to eject feedstock into the reactor with a droplet size diameter of 5-120 microns.

the process includes a further step of controlling a blower system within the reactor to induce vapor flow within the reactor at a rate of 3-20 feet/second.

the process includes further steps of controlling each of temperature, pressure and flow in the reactor to maintain a cut-point between the light hydrocarbon fraction and heavy hydrocarbon fraction between C20-030.

the process utilizes a crude oil feedstock having an API gravity less than 15 and wherein a feedstock feedrate, reactor temperature, carrier gas velocity and pressure, and heavy fraction recirculation rate are controlled to produce an asphalt product corresponding to approximately 70 vol % of the feedstock volume.

the feedstock has an API gravity of 6-15.

the process includes a further step of monitoring the concentration of nitrogen compounds in the uncondensed light fraction and directing a proportion of the uncondensed light fraction to a noxious emissions treatment system.

the process includes a further step of monitoring the concentration of sulphur compounds in the uncondensed light fraction and directing a proportion of the uncondensed light fraction to a sulphur treatment system.

the process includes a further step of blending crude-oil feedstocks having different API gravities prior to introducing the feedstock into the reactor.

the process utilizes a feedstock that is a high sulfur fuel oil (HSFO) or heavy fuel oil (HFO) and the sulfur content in the light hydrocarbon fraction are monitored and controlled to produce an IMO 2020 compliant fuel.

In another aspect, each production unit has a feedstock processing capacity of 3,000-4,000 barrels per day and two or more production units are connected in parallel to a common feedstock delivery system and product storage system.

In another aspect, the invention provides a network of modular oil refinery systems comprising a plurality of geographically distributed production units and each production unit are connected in parallel and have a common feedstock delivery system and product storage system.

BRIEF DESCRIPTION OF THE DRAWINGS

The invention is described with reference to the drawings, in which:

FIG. 1(1) is an overview of a modular crude oil refinery (MOOR) in accordance with one embodiment of the invention showing details of various pumping and control systems;

DETAILED DESCRIPTION OF THE INVENTION

The embodiments herein and the various features and advantageous details thereof are explained more fully with reference to the non-limiting embodiments that are illustrated in the accompanying drawings and the following description.

Overview and Rationale

Efficient deployment of smaller scale oil refining facilities or plants, such as a Modular Crude Oil Refinery (MOOR) as described herein, can enable local markets to "make their own fuels" and in the process reduce the retail cost of various hydrocarbon products including bunker, jet, diesel, and gasoline fuels, as well as other products such as asphalt binders. Such systems can provide benefits to local consumers by reducing the cost of transporting feedstocks and/or products from suppliers to refiners and buyers/consumers. For example, instead of importing refined fuels by sea/land/rail tankers full, a local MOOR can import a crude oil and, from that raw material, produce higher-value, higher-purity fuels that can be delivered and sold to that local market.

In addition, the MOOR process and systems as described herein have several technical advantages over conventional crude oil refining processes that are typically pollution-intensive, use various combinations of high-temperature, high-pressure processing and expensive upgrading equipment such as open-ended vertical distillation columns and other distillation columns.

As described herein, the MOOR is less complex, operates at lower temperatures and lower pressures than conventional refineries and can provide a safer, lower energy and less costly plant to build and operate. Furthermore, the MOOR achieves substantially zero-emissions by effective recycling of process gases in a closed-loop system. Importantly, the only emissions are from process heaters used to generate process heat that are external to a closed loop refining process. Moreover, these external emissions can be captured/scrubbed with other capturing/scrubbing systems.

The MOOR may also be operated to separate and deposit the majority of crude oil impurities into certain products such as a final stage residuum/asphalt product and, when required, impurities may be removed by separate gas/product treatment systems.

MOOR units can be constructed without threatening the local environment with toxic emissions that are typically associated with oil refineries and can thus be located within or adjacent to communities.

Figure 1:
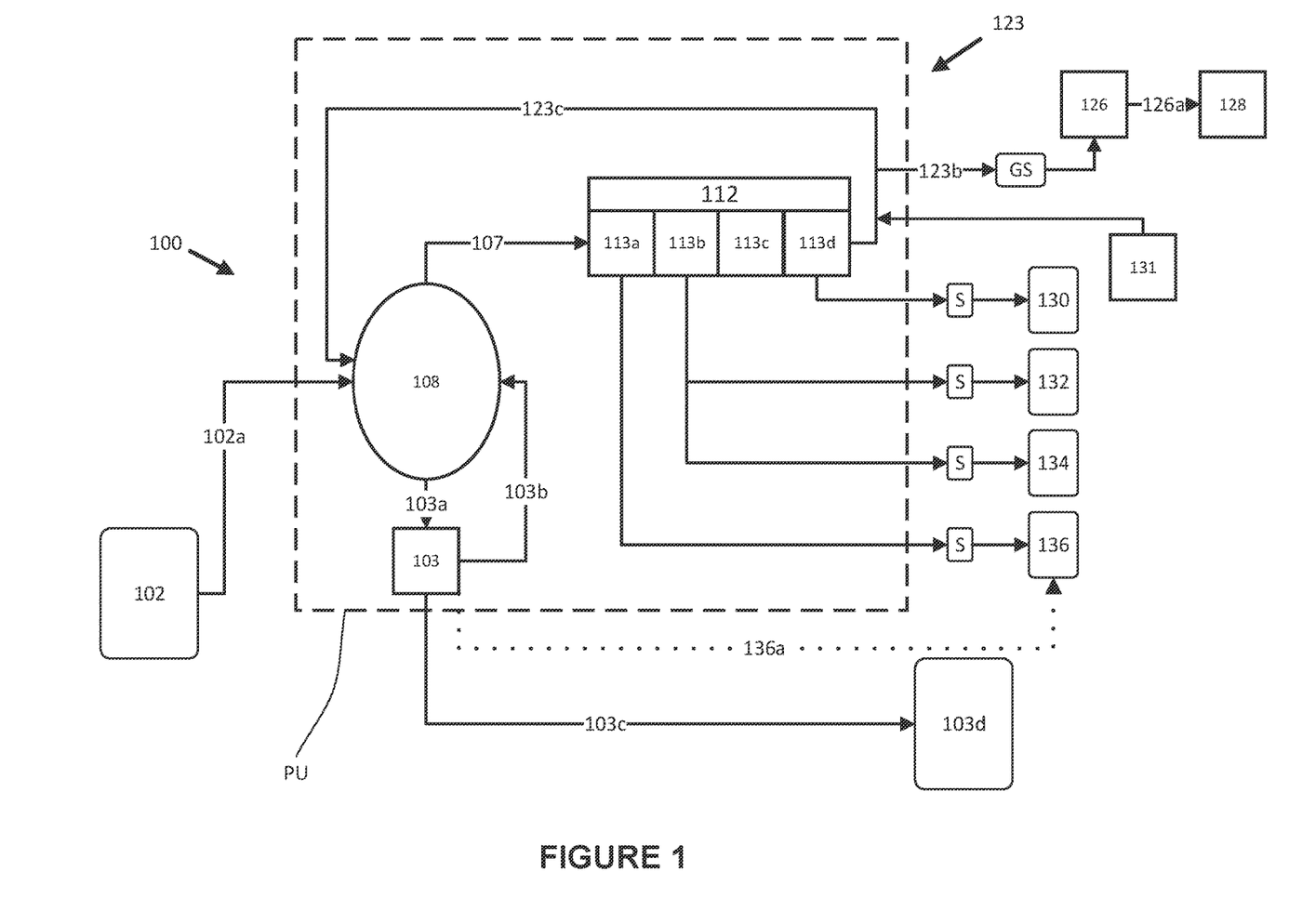
FIG. 1 is an overview of a modular crude oil refinery (MOOR) in accordance with one embodiment of the invention.

FIGS. 1 and 1(1) illustrate the MOOR system 100. FIG. 1 shows a high-level overview of the system and FIG. 1(1) shows further details of the systems, pumps, sensors and thermal control systems. As shown in FIG. 1, the system 100 includes a separation reactor 108, a condensing system 112, a heavy fraction collection and recirculation system (HFCRS) 103 and light fraction recirculation system (LFRS) 123. These systems are defined as a production unit (PU) that can be operatively linked together to scale processing capacity at a plant.

As shown, crude oil feedstock 102a from storage tank 102 is heated and introduced into reactor 108 to effect heavy and light fraction separation at a desired cut point under vacuum flashing conditions. Solvent 152 may be added if desired. A heavy fraction 103a is removed from the bottom of the reactor to the HFCRS 103 where a portion 103b is selectively returned to the reactor and a second fraction 103c is selectively removed as a heavy fraction product to heavy fraction product tanks 103d.

Light fraction 107 is removed from the top of the reactor to condenser 112. The light fraction 107 is condensed in a sectioned-cooling system within the condenser to produce at least one light fraction that is delivered to light fraction storage tanks 130, 132, 134 and 136. Uncondensed gases from the condenser are delivered to the LFRS 123 where a proportion 123c is selectively returned to the reactor and a second proportion 123b may be bled/recovered into a vapor recovery unit 126. Excess/recovered vapor 126a may be used as a fuel for heater 128.

With reference to FIGS. 1(1), 1A, 1B, 10 and 1D various embodiments are described with additional details of each section of the MOOR system and its operation.

Feed, Reactor and Heavy Fraction Collection and Recirculation Systems

Figure 1A:
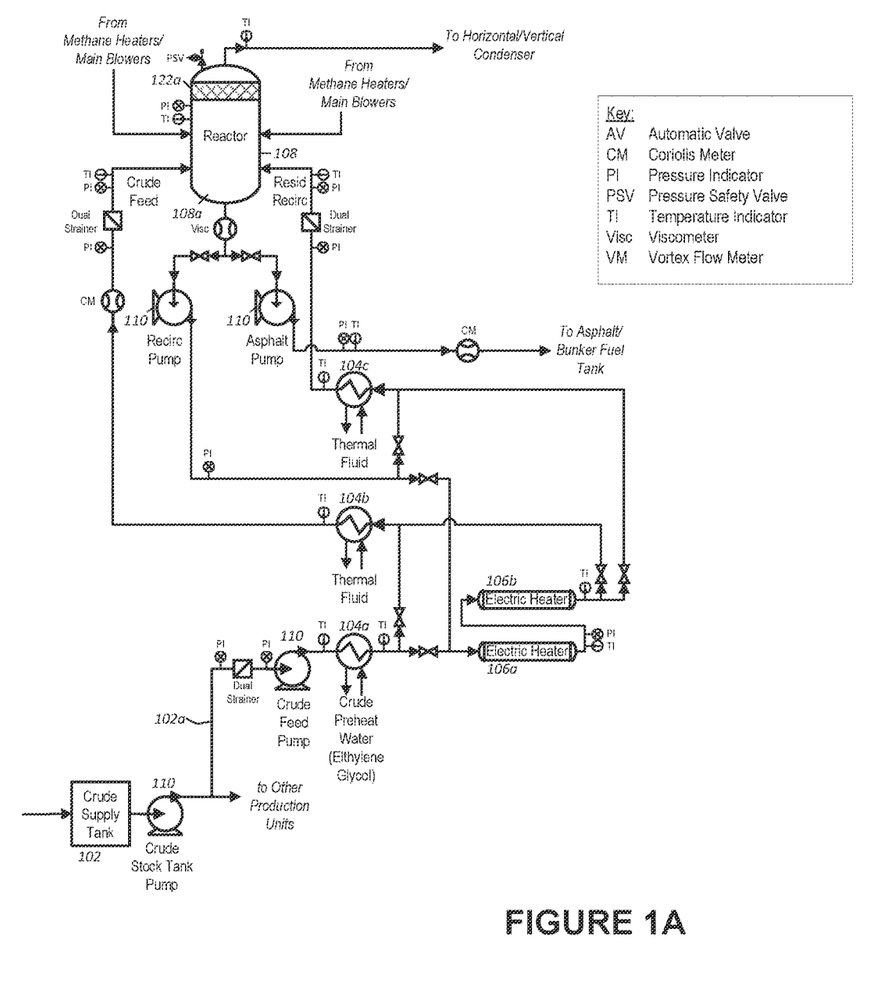
FIG. 1A is a system and process flow diagram illustrating a feedstock delivery system to a reactor in accordance with one embodiment of the invention.

FIG. 1A is a system and process flow diagram which illustrates an embodiment of the feedstock delivery and HFCRS systems. Crude oil 102a from crude oil stock tanks 102 passes through pumps (e.g. centrifugal pump or positive displacement pump) 110 to deliver feedstock to the reactor. Crude oil from the crude oil stock tanks 102 is maintained at ambient temperature for light crude and at 48-94° C. (120-200° F.) for heavy crude. For each feedstock, the pressure is increased from an initial pressure of 690 to 1375 kPa (100-200 psi) in the feed lines to a reactor input pressure of 1375 to 6700 kPa (200-1,000 psi). As shown, crude oil passes through a preheat heat exchanger 104a where it is, preheated (preferably from recovered heat from a first stage of condenser 112 to 93-204° C. (200-400° F.).

In various embodiments, the crude may be directed to a one or more electrical heaters 106a & 106b for heating and/or to a heat exchanger 104b as controlled by a plurality of control valves. The hot crude oil may be directed through a first path or a second path to raise the temperature to 200-320° C. (400-600° F.). When the crude takes the first path, it passes through two electric heaters 106a & 106b controlled by a plurality of control valves and passes through the heat exchanger 104b before the reactor 108. If the crude is directed through the second path, it bypasses the electric heaters and flows directly through heat exchanger 104*b* to be heated using thermal fluids (eg. heat recovered from hot products) before the reactor 108.

Hot crude with a temperature ranging from 200-320° C. (400-600° F.) enters the reactor 108 through a plurality of atomizing nozzles or other atomizing devices to atomize the crude oil to droplets in the range of 5-120 microns in size. The pressure inside the reactor 108 is maintained in a range from 0-30 inHg. Accordingly, the heated crude feedstock is sprayed into the vacuum condition at an input pressure of 1375 to 6700 kPa (200-1,000 psi) and temperature of 200-320° C. (400-600° F.) resulting in rapid and efficient vaporization of the lighter end hydrocarbon chains. This spray atomization and vacuum flashing allows for more efficient separation of the feedstock into light end chains and heavy end chains at lower temperatures and with less energy at this stage as compared to a conventional refinery that would operate at a substantially higher temperature to boil the feedstock. The lighter chains are carried out of the reactor 108 through a separator 122*a* into a condenser such as a multi-stage horizontal/vertical condenser 112. Heavier hydrocarbon chains drop to the sump 108*a* of the reactor 108. Residuum (i.e. the heavy fraction containing heavier hydrocarbon chain compounds) is removed from the sump 108*a*, upon which a proportion is selectively re-circulated back into the reactor via pumps (eg. re-circulating centrifugal or positive displacement pump 110) through an atomizing system as described above in order to further extract lighter chains from the heavy fraction. Residuum collected in the sump 108*a* may also pass through a heat exchanger 104*c*.

Figure 1B:
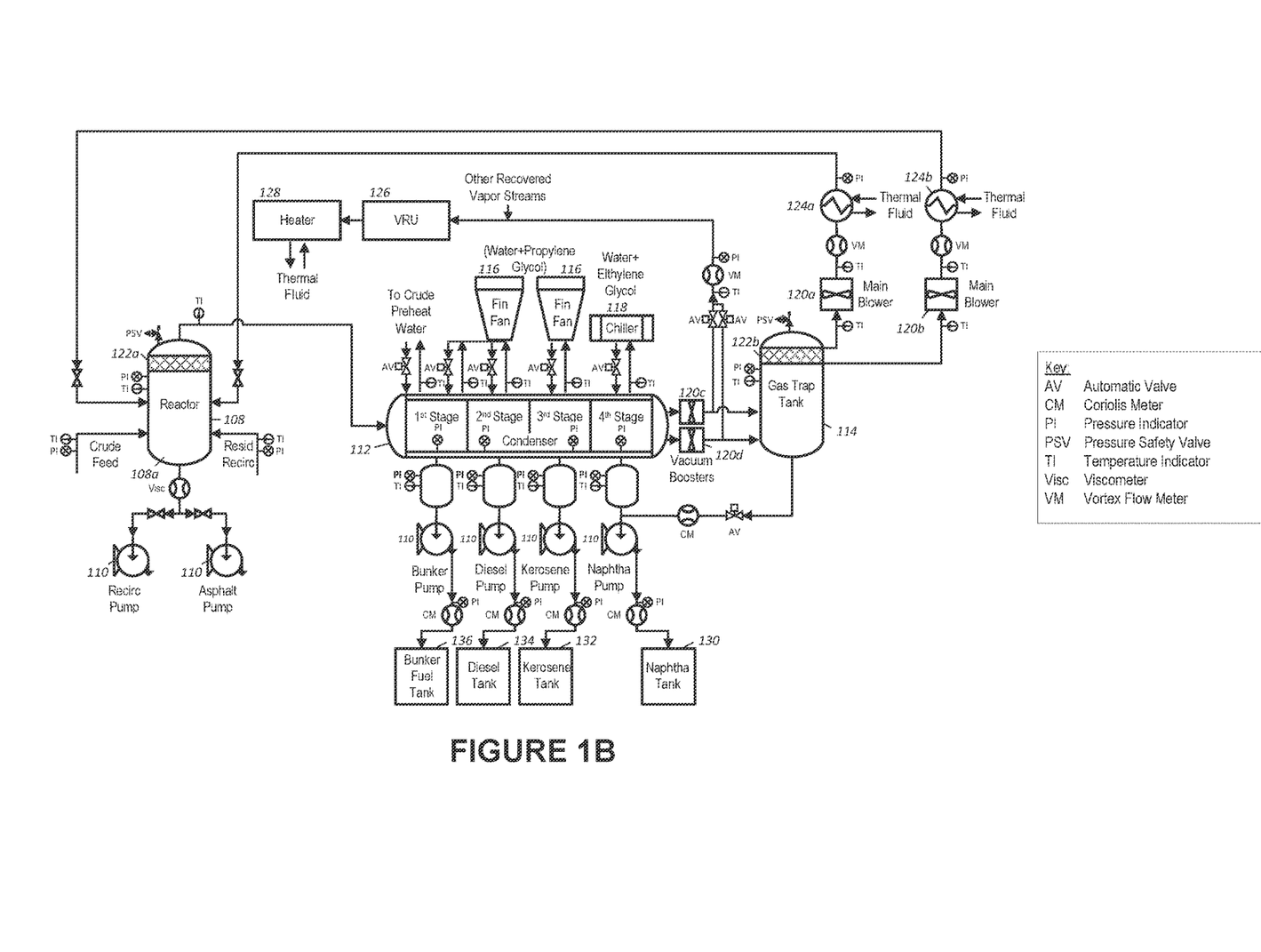
FIG. 1B is a system and process flow diagram illustrating a condenser and light fraction recovery system in accordance with one embodiment of the invention.
Figure 1C:
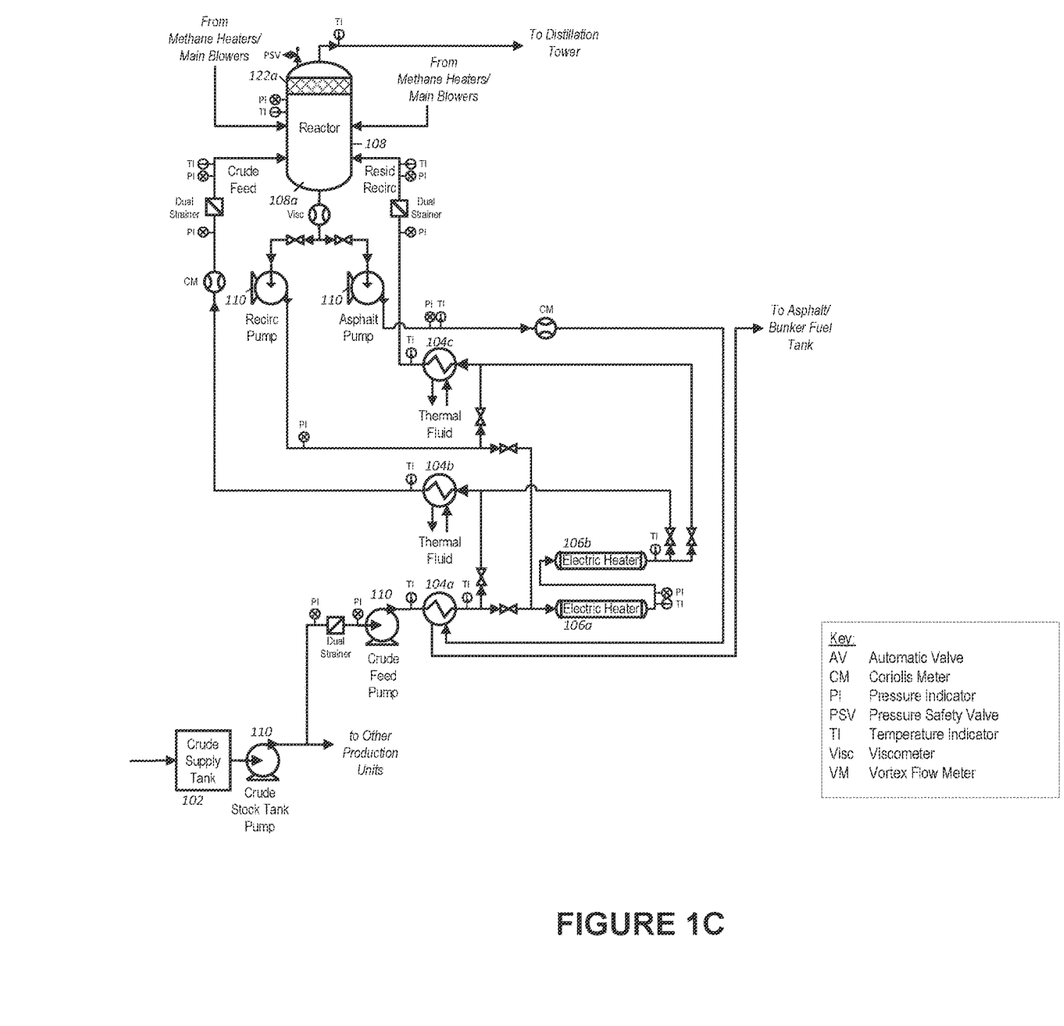
FIG. 1C is a system and process flow illustrating a feedstock delivery system to a reactor in accordance with one embodiment of the invention.
Figure 1D:
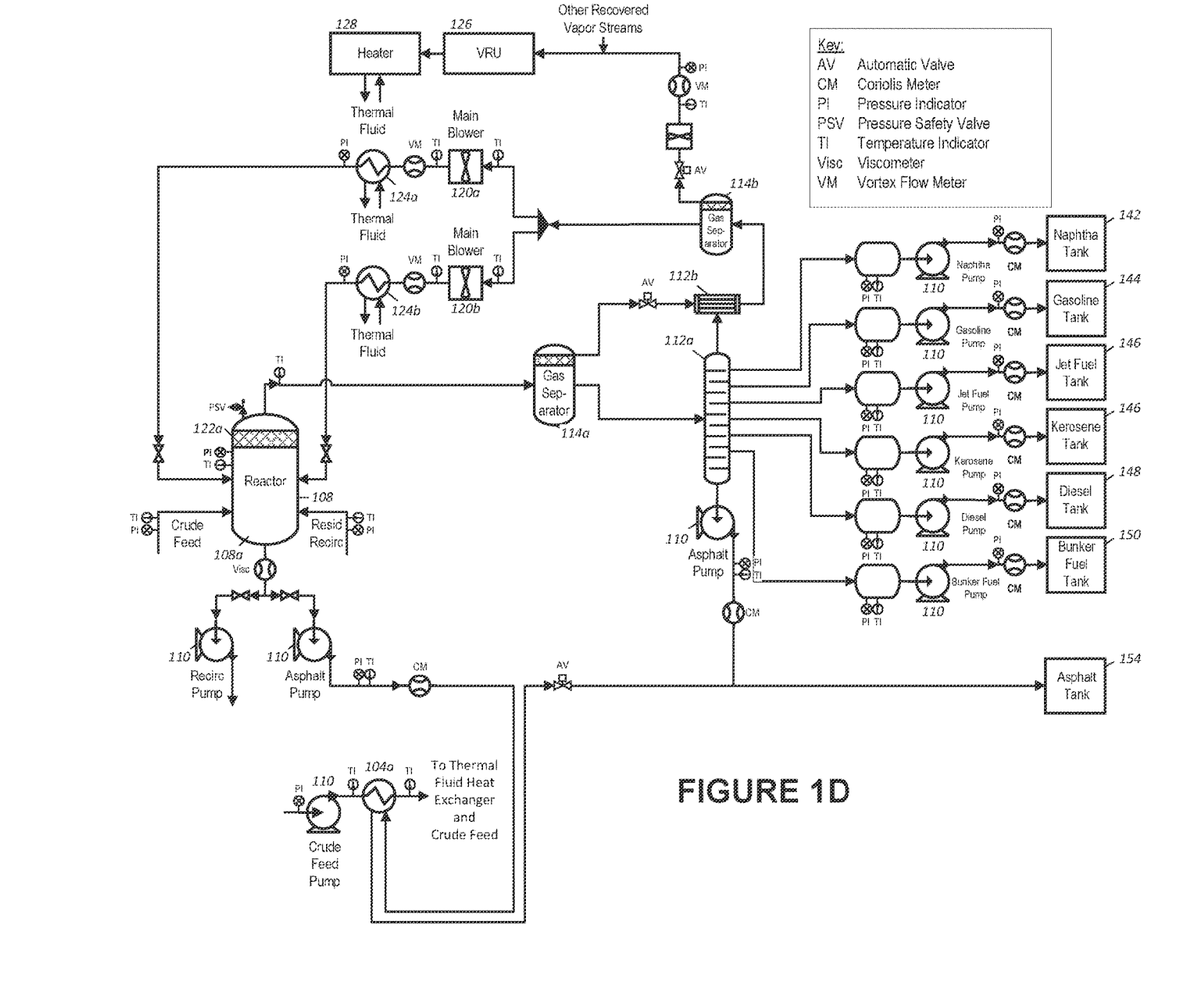
FIG. 1D is a system and process flow diagram in accordance with one embodiment of the invention where products are condensed in a distillation tower.

Depending on the API gravity of the feedstock and the operational parameters, residuum from the reactor is either pumped as bunker fuel (#4 diesel) 136*a* and collected into a bunker fuel stock tank 136 or pumped as asphalt and collected into a heavy product storage tank 103*d* (FIG. 1) or asphalt output storage tank 154 (FIG. 1D).

Condenser and Light Fraction Recirculation Systems

FIG. 1B is a system and process flow diagram illustrating a multi-stage horizontal condenser 112 and corresponding outputs from each stage in accordance with one embodiment. As shown, vapor from reactor 108 enters the multi-stage horizontal condenser 112 having at least one section/stage (preferably 3 or more) to condense the vapor into targeted products. Vapor containing C1-C4 carbon chains will typically not condense in the multi-stage horizontal condenser, and these lighter chains will be recovered by vapor trap tank 114 and delivered to the vapor recovery unit 126 to be burned by process heaters or similar devices 128. Main blowers 120*a*, 120*b* and optionally vacuum boosters 120*c*, 120*d* draw a vacuum in the reactor 108 through the multi-stage condenser 112 and deliver vapor to the vapor trap tank 114. Vapor from the vapor trap tank 114 passes through a separator 122*b* to remove any entrapped gases. Methane and other vapor are circulated from vapor trap tank 114 by main blowers 120*a*, 120*b*. Main blowers 120*a*,120*b* increase the velocity and pressure of the gases which are passed through methane heaters 124*a*,124*b* which use thermal fluids or other heating mediums to raise the temperature of the gases to the reactor temperature. Heated gases from the methane heaters 124*a*, 124*b* enter the reactor 108 through a plurality of nozzles or other process devices from the sides of the reactor 108. These gases pass through the reactor carrying atomized crude oil particles at a rate of 3-20 feet per second and reach the separator 122*a* inside or on top of the reactor. Shorter carbon chain molecules are passed through the separator 122*a*, while longer carbon chain droplets/molecules impact the separator 122*a* and fall into the sump 108*a* of the reactor 108. Additional carrier gas may be introduced via a supplemental carrier gas system 131 (FIG. 1).

Importantly, as the initial feedstock crude is passed through the reactor 108, approximately 60-70% of any sulfur in the feedstock stays with the heavier end chains as the heavier fractions fall down the sides of the reactor. As such, sulfur is collected in the sump with the residuum with at least a portion of the total sulfur sequestered within asphalt binder products.

As noted, the condensed fuel products are collected into each of the respective fuel storage tanks 130, 132, 134, 136.

A commercial 3rd party gas scrubber system GS (FIG. 1) can used before the vapor recovery unit to remove sulfur and nitrogen compounds in the collected vapors if needed to reduce GHG emissions to desired levels. In addition, a commercial 3rd party sulfur removal system S can used to remove additional sulfur in condensed fuel products prior to fuel storage tanks to meet fuel specifications.

As noted, vapor from the reactor 108 enters the multi-stage horizontal condenser 112. The multi-stage horizontal condenser 112 may have three to four sections/stages according to the specifications of the fuels that are to be produced. The multi-stage horizontal condenser condenses side-ways or laterally flowing vapor through a condenser tube, such that the targeted low temperature of the condenser condenses the remaining vapor into bottom section compartments of the condenser corresponding to the different fuel fractions contained in the crude oil. Alternatively, the condenser may be a vertical condenser, in which case vapor is cooled in separate vertically stacked compartments and condensed droplets fall down via gravity within each compartment. As above, each compartment is designed to condense at targeted temperatures to produce targeted fuel products that can be collected in separate storage tanks.

The stages of the multi-stage horizontal reverse condenser in accordance with one embodiment, are shown in FIG. 1B with the first stage taking the inlet temperature of the vapor from the reactor 200-320° C. (400-600° F.) and condensing the vapor to a temperature range of 95-65° C. (200-150° F.) to produce diesel fuel (#2 diesel fuel) from the first stage of multi-stage horizontal condenser 112 which is collected in the diesel stock tank 134. The cooling medium is obtained from heat exchanger 104*a*. The second stage takes the temperature (95-65° C. (200-150° F.)) from first stage and uses a fin fan 116 or similar system to condense the vapor to 75-10° C. (170-50° F.) to obtain kerosene or jet fuel which gets collected into a kerosene/jet fuel stock tank 132. Further, the third stage uses chillers 118 or similar system to reduce the temperature from the second stage (75-10° C. (170-50° F.) to 15--6° C. (60-20° F.)) to produce naphtha or gasoline fuel which is collected in a naphtha/gasoline stock tank 130.

FIG. 10 is a system and process flow diagram similar to FIG. 1A illustrating the feedstock input system and HFCRS. FIG. 10 illustrates one embodiment where the condenser is a distillation tower and heat recovered from the residuum from a product side of the reactor is used to partially heat the feedstock.

Distillation Tower

FIG. 1D is a system and process flow diagram illustrating an embodiment utilizing a distillation tower 112*a* and a second heavy fraction collection system. As shown, vapor from the reactor 108 enters a gas separator 114*a* wherein vapors are introduced into a distillation tower 112*a* under vacuum. Light fractions rise to their condensable levels and are collected from a plurality of fractionation trays. Gases leaving the gas separator 114a and the distillation tower 112a are cooled by a heat exchanger 112b prior to the main blowers and the vapor recovery unit (VRU) 126 via a gas separator 114b. Naphtha fuel is condensed and collected in a naphtha product tank 142. Gasoline fuel is condensed and collected in a gasoline product tank 144. Jet fuel is condensed and collected in a jet fuel product tank 146. Kerosene fuel is condensed and collected in a kerosene product tank 146. Diesel is condensed and collected in a diesel product tank 148. Bunker fuel is condensed and collected in a bunker fuel product tank 150. Heavier long chain hydrocarbons fall to the bottom of the distillation tower 112a and are pumped (eg. via a centrifugal or positive displacement pump 110) into the asphalt stream from the reactor 108 to an asphalt product tank 154.

Reactor Design

Figure 2:
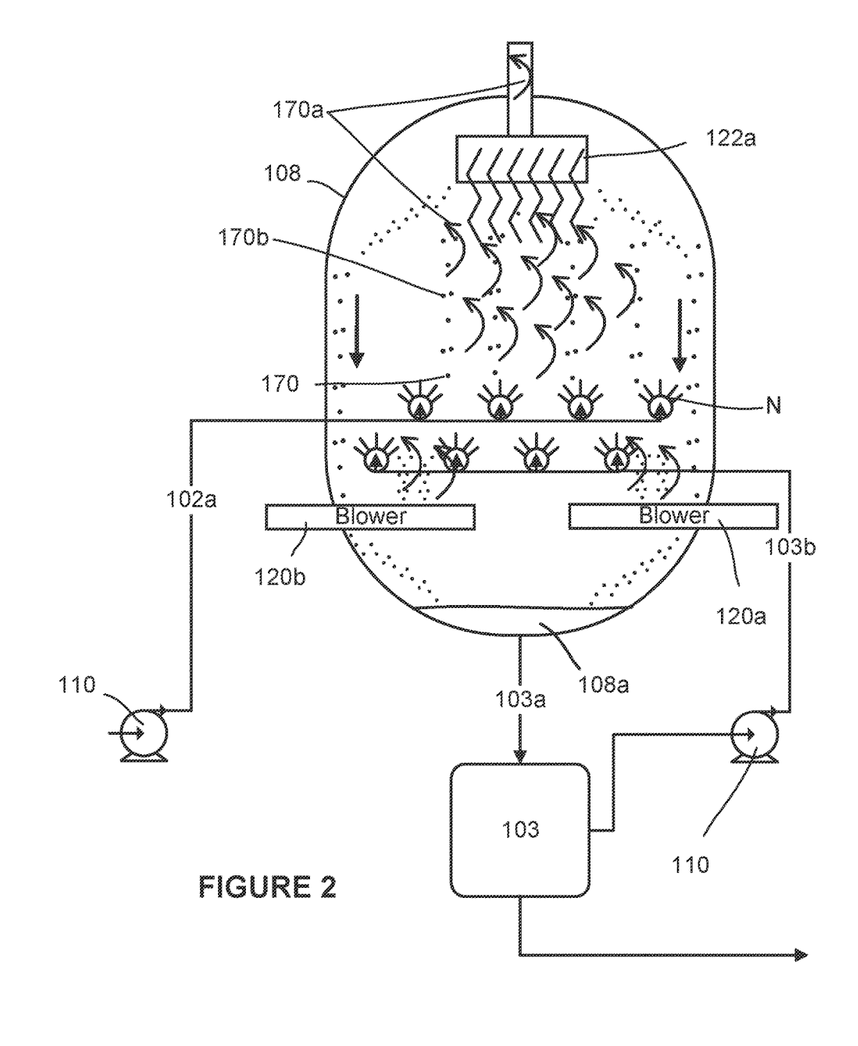
FIG. 2 is a schematic diagram of the reactor used in the crude oil refining process according to an embodiment herein.

FIG. 2 illustrates an embodiment of the reactor 108. As described above, hot crude oil feedstock from the crude feed tank 102 enters the reactor with an input pressure of 1375 to 6700 kPa (200-1,000 psi) through plurality of nozzles N or other process devices designed to atomize the crude oil to droplets in the range of 5-120 microns in size. These droplets are sprayed into the reactor under a vacuum, preferably from 0-30 inHg, which causes rapid and efficient vaporization of the lighter end hydrocarbon chains 170a. This spray atomization and vacuum flashing in the reactor enables efficient separation of the feedstock into light fractions and heavy fractions at lower temperatures. In addition, vapor from vapor trap tank or gas separator 114a or 114b enters the reactor through one or more blowers 120a, 120b. The blower(s) with returned gases circulates the atomized crude droplets 170 at a velocity of 3-20 feet per second to the separator 122a located inside the reactor 108, where light short chains 170a of the light fraction pass through the separator 122a and are delivered to the condenser 112 or distillation tower 112a. The separator 122a together with vertical movement of droplets/vapor in the reactor causes heavier long chain hydrocarbons 170b of the heavy fraction to fall down the sides of the reactor as shown by the arrows to be collected in the sump 108a of the reactor. A portion of the heavy fraction collected in the sump 108a can be re-circulated back into the reactor using a pump 110 for further processing to separate additional light fraction. After the recycling step, and depending on the feedstock API gravity, either bunker fuel (#4 diesel fuel) or asphalt is finally delivered to the product tanks.

System Control

System control is accomplished by the various pumps, blowers, control valves, safety valves and heat exchangers as described above, together with appropriate temperature, pressure, flow, density, Coriolis meters, vortex flow meters and other sensors throughout the system. Typically, and depending on the feedstock, the reactor is controlled to effect heavy fraction and light fraction separation at a chosen cut point, typically about C20-O30.

Generally, as described below, different API feedstocks will enable production of different proportions of heavy fractions and light fractions. Thus, based on the feedstock API, the temperature, pressure and flow rates are controlled with appropriate feedbacks throughout the systems to provide sufficient residence times in each of the reactor, HFCRS, condenser and LFRS to a) provide separation of the heavy and light fractions in the reactor at the desired cut point, and b) condensation of light fractions in the condenser at the desired product compositions.

Crude Oil Feedstocks and Products

The MOOR has the capacity to process a wide variety of feedstocks having a range of API gravities from extra-heavy bitumen (API 6-8) to light oils (API up to about 45). As noted, the feedstock and control of the system can be controlled to produce a variety of products. Table 1 provides a range of feedstocks with varying API gravities and the representative proportions of asphalt, light and gas fractions that may be produced.

TABLE 1

Representative Feedstocks and Proportions of Asphalt, Light and Gas Fractions

| Feedstock | API | % Asphalt Fraction (wt %) | % Light Fraction (wt %) | Gas Fraction (wt %) |
| --- | --- | --- | --- | --- |
| Athabasca Thermal | 8.2 | 81.8 | 18.9 | 0.3 |
| Cold Lake Thermal | 10.8 | 72.9 | 26.7 | 0.4 |
| Wabasca Primary | 12.7 | 70.0 | 25.5 | 0.5 |
| Santa Maria | 13.0 | 73.0 | 26.5 | 0.5 |
| Midland Texas | 40 | 1.0 | 95.0 | 4.0 |

In various embodiments, the MOOR is operated as an asphalt refinery utilizing feedstocks having an API less than about 25 and preferably in the range of 6-15 API. In these embodiments, an asphalt binder is produced that is end-user ready and the light fraction may be further processed to produce light fraction products. Depending on the requirements, the light fraction may be processed to meet tighter product specifications or may processed to produce one or more lighter crude oil feedstocks for other refineries. Moreover, additional polishing of the light fraction product compositions may be conducted at the MOOR or coarser-cut light products without polishing may be delivered to customers.

Modular Deployment

Figure 3:
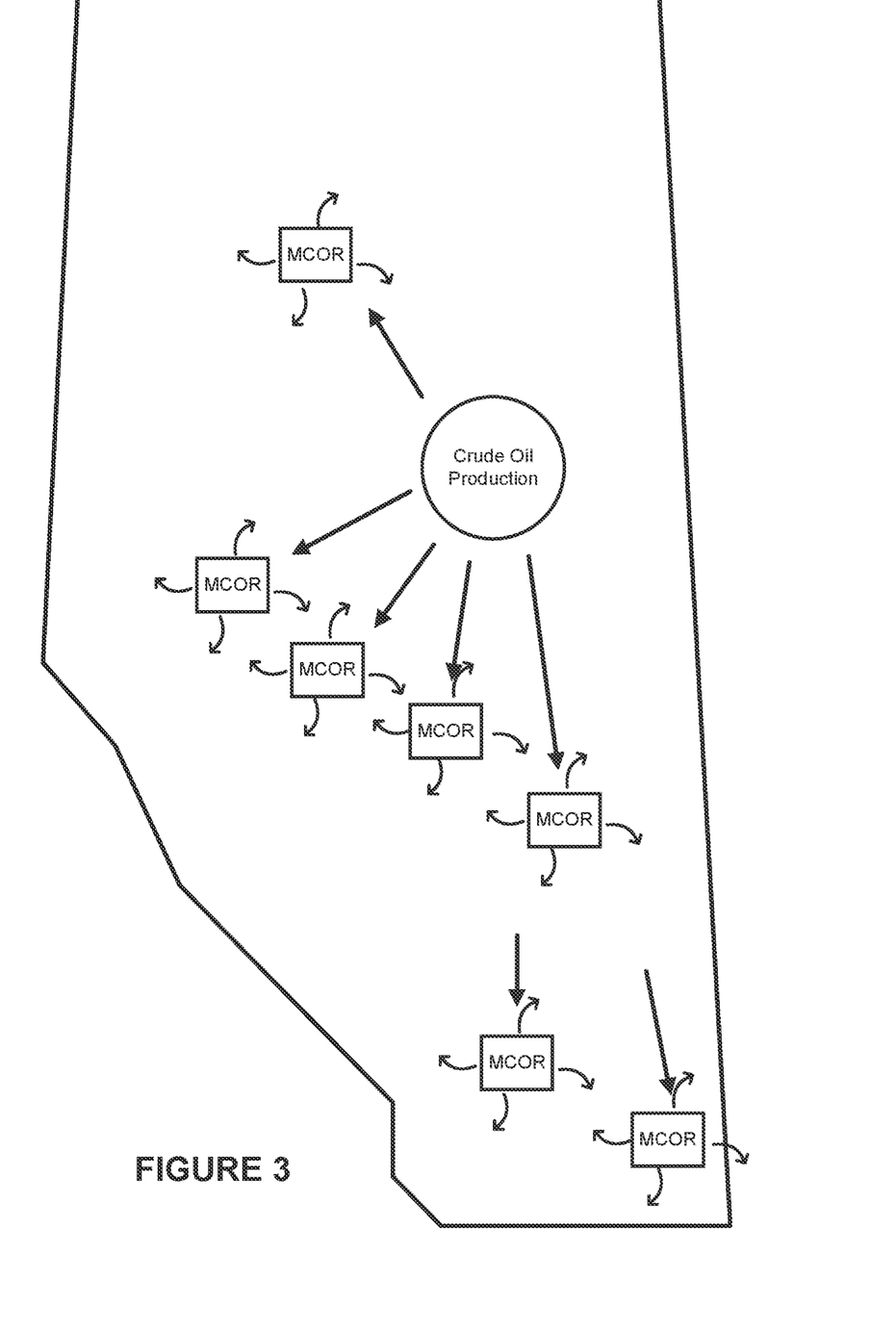
FIG. 3 is a schematic diagram showing geographical deployment of MOOR production units in accordance with one embodiment of the invention.

The MOOR is designed at a scale for efficient and economic deployment and to enable further scaling of the system. Generally, as noted above and illustrated in FIG. 3, the MOOR can be deployed in a wider range of locations compared to conventional refinery technology due to the scalability of an MOOR and the lack of emissions. As shown in FIG. 3, a heavy crude oil source can be shipped by road or rail tanker or pipeline to a number of geographically distributed MOOR plants. Products produced by the MOOR plants can be sold to local markets thus reducing overall transportation/production costs.

The optimal size of an MOOR production unit PU (FIG. 1) is based on a reactor designed to process about 3,000-4,000 bpd of crude oil feedstock. Based on flow volumes of fluids/gases and the requirement for pumps and blowers to provide both flow rates and maintain reactor operating conditions together with economic considerations, a preferred reactor capacity is approximately 3,000 bpd. Although larger reactors can be built, larger capacity pumps, blowers and piping would be required to enable reactor operating conditions at higher throughputs which can increase capital costs and reduce operational efficiencies and/or flexibility. As such, in deployments where a larger capacity throughput is required, individual production units including reactors, condensers and heavy and light fraction recirculation systems can be integrated and connected in parallel where each production unit shares feedstock delivery systems/tanks, product tanks, carrier gas systems, vapor recovery units and sulfur removal systems.

As such, depending on available land, multiple production units can be integrated to increase the overall capacity of the plant to match the market needs. In various embodiments, 35 or more production units can be deployed together with shared equipment as noted above. Importantly, modular integration of production units allows operators to scale-up (as well as scale-down) operations based on changing market conditions. For example, if a market is growing or shrinking after deployment, additional production units can be added or removed from a facility in discrete volumes allowing operators to adjust to local market conditions more readily.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A crude oil refining system for separating hydrocarbons within a crude oil feedstock with reduced emissions comprising one or more production units, each production unit having:
    a reactor for separating the feedstock into heavy and light fractions, the reactor having a reactor body including:
        a first atomizing system for introducing and atomizing feedstock in the reactor body under conditions to effect rapid surface-area generation of the feedstock and separation of the feedstock into heavy and light fractions;
        a heavy fraction removal system adjacent a bottom of the reactor body;
        a light fraction removal system adjacent a top of the reactor body;
    a condenser connected to the at least one reactor to receive the light fraction, the condenser having:
        a condenser body;
        a sectioned cooling system configured to the condenser body to condense the light fraction into one or more light hydrocarbon products;
        a light hydrocarbon collection system for selectively removing the one or more light hydrocarbon products;
        a light fraction return system configured between the condenser and reactor to return un-condensed light fraction gases to the reactor;
    a heavy-fraction collection and recirculation system (HFCRS) connected to the heavy fraction removal system, the HFCRS having:
        a heavy fraction product system for selectively removing a heavy fraction product from the HFCRS; and
        a heavy fraction recirculation system for selectively recirculating and atomizing a portion of the heavy fraction to the reactor through a second atomizing system independent of the first atomizing system, and wherein the second atomizing system introduces the portion of the heavy fraction into the reactor independent of the introduction of feedstock into the reactor; and
    where the reactor and the condenser are connected in a first loop, and the reactor and the HFCRS are connected in a separate second loop.

2. The system as in claim 1 where the light fraction return system includes a carrier gas system configured to selectively introduce a carrier gas into the light fraction return system.

3. The system as in claim 2 further comprising a vapor recovery unit connected to the condenser configured to selectively bleed excess vapor from the loop.

4. The system as in claim 3 further comprising a burner connected to the vapor recovery unit to burn excess vapor outside the loop and wherein combustion heat from the burner is thermally connected to any one of or a combination of the feedstock as a source of heat to pre-heat the feedstock and the light fraction return gas as a source of heat to pre-heat the light fraction return gas.

5. The system as in claim 1 where the reactor includes a blower system configured below the first and second atomizing systems to promote vertical movement of vapor and droplets within the reactor.

6. The system as in claim 1 further comprising a feedstock system having a feedstock storage tank connected to the reactor, the feedstock system having at least one heater to pre-heat the feedstock prior to the reactor.

7. The system as in claim 1 further comprising a control system operatively connected to the system and configured to enable selective control of temperature, pressure and flow of vapor in the reactor to set a cut-point in the reactor between the light fraction and heavy fraction.

8. The system as in claim 7 where the control system is operatively connected to the system and configured to enable independent and selective control of a feedstock flow rate into the reactor, a heavy fraction recirculation rate into the reactor and a heavy product removal rate from the system.

9. The system as claim 7 where the control system is configured to maintain a reactor temperature between 200-320° C. (400-600° F.).

10. The system as in claim 7 where the control system is configured to enable flash atomization of the feedstock at a reactor pressure of 0-30 in Hg.

11. The system as in claim 7 where the first atomizing system includes a plurality of atomizing nozzles, and the control system and the first atomizing system are configured to introduce feedstock through the atomizing nozzles at 1375 to 6700 kPa (200-1,000 psi).

12. The system as in claim 11 where the second atomizing system includes a plurality of atomizing nozzles and the control system and the atomizing nozzles of the second atomizing system are configured to introduce returned heavy fraction through the atomizing nozzles of the second atomizing system at 1375 to 6700 kPa (200-1,000 psi).

13. The system as in claim 7 where the control system and the first atomizing system are configured to eject feedstock into the reactor with a droplet size diameter of 5-120 microns.

14. The system as in claim 7 where the control system and blower system are configured to induce vapor flow within the reactor at a rate of 3-20 feet/second.

15. The system as in claim 1 where the HFCRS includes a heater configured to add heat to the heavy fraction before the proportion of the heavy fraction is re-introduced into the reactor.

16. The system as in claim 1 where the sectioned cooling system is a horizontal condenser configured to condense the light fraction in at least one stage, each stage producing a light hydrocarbon product including any one of or a combination of bunker fuel, diesel fuel, kerosene and naphtha.

17. The system as in claim 1 where the sectioned cooling system is a vertical condenser configured to condense the light fraction in at least one stage, each stage producing a light hydrocarbon product including any one of or a combination of bunker fuel, diesel fuel, kerosene and naphtha.

18. The system as in claim 1 where uncondensed light fraction gases from the condenser have a temperature less than 10° C. (50° F.).

19. The system as in claim 1 where the light fraction return system includes a gas trap connected to the condenser to separate uncondensed light fraction gases from the condenser as the uncondensed light fraction gases and a naphtha fraction.

20. The system as in claim 1 where the condenser is a distillation tower configured to condense a plurality of light hydrocarbon products and a second heavy fraction configured for re-introduction into the HFCRS.

21. The system as in claim 1 where the reactor body includes a sump for collecting the heavy fraction.

22. The system as in claim 1 wherein the system includes at least two production units configured to a feedstock system in parallel, the feedstock system having a single feedstock storage tank connected to each production unit.

23. An oil refinery system as in claim 1 wherein each production unit has a feedstock processing capacity of 3,000-4,000 barrels per day and two or more production units are connected in parallel to a common feedstock delivery system and product storage system.

24. A reactor for separating a crude oil feedstock into heavy and light fractions, the reactor having a reactor body including:
 a first atomizing system and first atomizing nozzles for introducing and atomizing a feedstock in the reactor body under conditions to effect rapid surface-area generation of the feedstock and separation of the feedstock into heavy and light fractions;
 a heavy-fraction collection and recirculation system (HFCRS) connected to the reactor body, the HFCRS having:
  a heavy fraction product system for selectively removing a heavy fraction product from the reactor; and,
  a heavy fraction recirculation system for selectively recirculating and atomizing a portion of the heavy fraction to the reactor through a second atomizing system independent of the introduction of feedstock into the reactor;
 wherein the first and second atomizing systems are separate loops; and,
 a light fraction removal system adjacent to the top of the reactor body.

25. The reactor as in claim 24 further comprising a feedstock system for delivering feedstock to the reactor, the feedstock system having a feedstock storage tank connected to the reactor and at least one heater to pre-heat the feedstock prior to entering the reactor.

26. The reactor as in claim 24 further comprising a carrier gas system configured to the reactor for introducing a carrier gas into the reactor.

27. The reactor as in claim 24 where the reactor includes a blower system configured below the first and second atomizing nozzles to promote vapor circulation within the reactor.

28. The reactor as in claim 24 where the reactor includes a vapor separator adjacent the top of the reactor body.

29. The reactor as in claim 24 further comprising a control system operatively connected to the reactor and configured to enable selective control of temperature, pressure and flow of droplets and vapor in the reactor to set a cut-point in the reactor between the light fraction and heavy fraction.

30. The reactor as in claim 29 where the control system is further configured to enable independent and selective control of a feedstock flow rate into the reactor, a heavy fraction recirculation rate into the reactor and a heavy product removal rate from the system.

31. The system as claim 29 where the control system is configured to maintain a reactor temperature between 200-320° C. (400-600° F.).

32. The reactor as in claim 29 where the control system is configured to enable flash atomization of the feedstock at a reactor pressure of 0-30 in Hg.

33. The reactor as in claim 29 where the control system and atomizing nozzles are configured to introduce feedstock into the atomizing nozzles at 1375 to 6700 kPa (200-1,000 psi).

34. The reactor as in claim 29 where the control system and the first atomizing nozzles are configured to eject feedstock into the reactor with a droplet size diameter of 5-120 microns.

35. The reactor as in claim 29 where the control system and blower system are configured to induce vapor flow within the reactor at a rate of 3-20 feet/second.

36. A modular oil refinery system comprising a plurality of geographically distributed production units as defined in claim 1 and where each production unit is connected in parallel and have a common feedstock delivery system and product storage system.

37. A crude oil refining system comprising one or more production units, each production unit having:
 a reactor for separating the feedstock into heavy and light fractions, the reactor having a reactor body including:
  a first atomizing system for introducing and atomizing feedstock in the reactor body under conditions to effect rapid surface-area generation of the feedstock and separation of the feedstock into heavy and light fractions;
  a heavy fraction removal system connected to a bottom of the reactor body; and
  a light fraction removal system adjacent a top of the reactor body;
 a condenser connected to the at least one reactor to receive the light fraction, the condenser having:
  a condenser body;
  a sectioned cooling system configured to the condenser body to condense the light fraction into one or more light hydrocarbon products;
  a light hydrocarbon collection system for selectively removing the one or more light hydrocarbon products;
  a light fraction return system configured between the condenser and the reactor to return un-condensed light fraction gases to the reactor;
 a heavy-fraction collection and recirculation system (HFCRS) connected to the heavy fraction removal system, the HFCRS having:
  a heavy fraction product system for selectively removing a heavy fraction product from the HFCRS; and
  a heavy fraction recirculation system for selectively recirculating and atomizing a portion of the heavy fraction to the reactor through a second atomizing system independent of the first atomizing system, and wherein the second atomizing system introduces a portion of the heavy fraction into the reactor independent of the introduction of feedstock into the reactor;

a control system configured to enable independent and selective control of a feedstock flow rate into the reactor via the first atomizing system and a heavy fraction recirculation rate into the reactor via the second atomizing system.

38. The system as in claim 37 wherein the control system is configured to enable selective control of temperature, pressure, and flow of vapor into the reactor to set a cut-point in the reactor between the light fraction and heavy fraction.

* * * * *